Dec. 17, 1935.  H. S. HINCHMAN  2,024,222
TOGGLE RELEASE HOOK
Filed Sept. 11, 1933
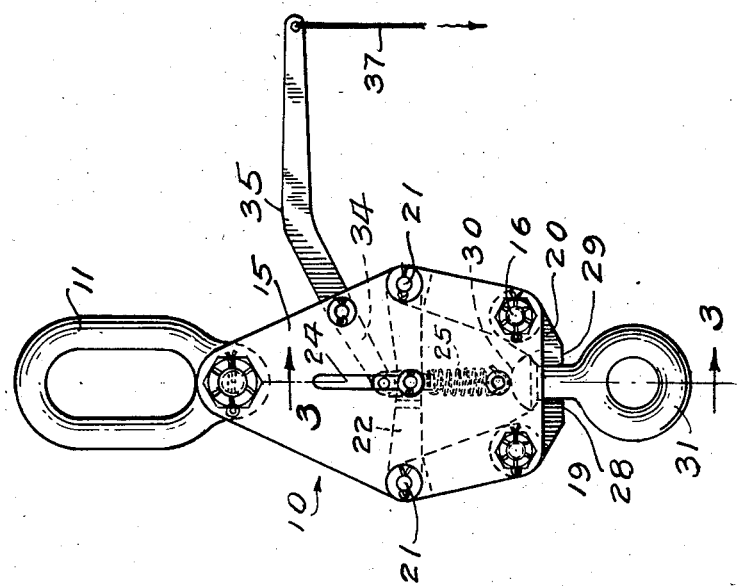
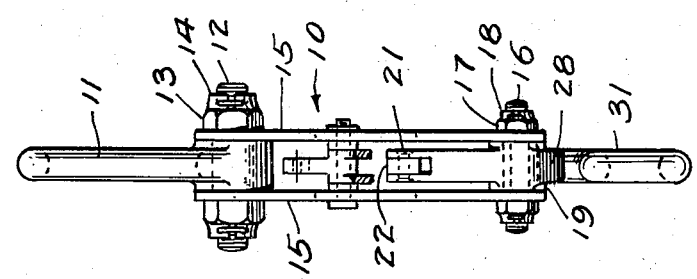
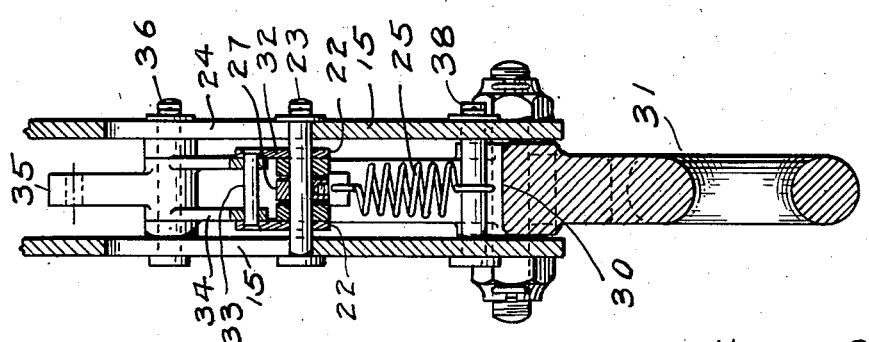
HARVEY S. HINCHMAN
INVENTOR
BY
ATTORNEY Patented Dec. 17, 1935

2,024,222

UNITED STATES PATENT OFFICE 2,024,222

TOGGLE RELEASE HOOK

Harvey S. Hinchman, Merchantville, N. J.

Application September 11, 1933, Serial No. 688,934

4 Claims. (Cl. 294—106)

(Granted under the act of March 3, 1883, as amended April 30, 1928; 370 O. G. 757)

This invention relates to a toggle release hook, and has for an object to provide an improved toggle release hook especially intended for accurate drop testing.

Another object of this invention is to provide a release hook that will securely hold any object within the limits set by the strength of the material and will be operable by a very slight trip load to drop the object without imparting any pendulous or oscillatory motion thereto whatsoever.

A further object is to provide a release hook of the toggle type especially useful not only in drop tests as in dropping airplanes to determine the strength of the landing gear, but also adapted for towing tests, emergency release of fuel tanks from planes and airships, releasing means for torpedoes and bombs, or other similar functions.

With the above and other objects in view, this invention consists in the construction, combination and arrangement of parts as will be described more fully hereinafter.

In the drawing:

Fig. 1 is an elevational view of this release hook, the interior details being shown in dotted outline;

Fig. 2 is a side view of Fig. 1;

Fig. 3 is an enlarged section on line 3—3 of Fig. 1.

There is shown at 10, the quick release hook constituting this invention. This release hook 10 comprises a supporting link 11 secured by means of stud bolt 12 and securing nuts 13 and lock nuts 14 between plates 15 constituting the frame of the hook. Similar stud bolts 16 suitably secured by nuts 17 and lock nuts 18 serve to hold the bottom ends of the plates 15 together and at the same time form pivots for two pawls 19 and 20. The other ends of the pawls 19 and 20 each contain the pivots for the toggle rods 22. The other ends of the toggle rods 22 are apertured and secured together by means of a pin 23 passing through said apertures and slidably held within slots 24 in plates 15. Another pin 38 secured between plates 15 below pin 23 serves as a securing means for a spring 25 that is secured to a washer member 27 operating the apertured ends of rods 22 about pin 23. As will be obvious, the action of spring 25 is such that it will tend to draw the pin 23 and ends of the rods 22 downwardly. The slot 24 is of such length and so positioned that when pin 23 is in its lowermost position, it is just slightly below a plane extending between pivot pins 21. The pawls 19 and 20 terminate at their lower ends in jaws 28 and 29 which, when the pin 23 is at its lowermost position, grasp the flanged head 30 of a link 31 in the manner shown. Link 31 is the load-holding link, that is, the object that is to be supported and released by hook 10 is securely fastened through the link 31. When it is desired to release the load on link 31 from the hooked end, pawls 19 and 20 are rotated about pivots 16 so as to cause jaws 28 and 29 to recede from each other until the boss 30 on link 31 may drop therethrough. This is accomplished by drawing pin 23 upwardly against the action of spring 25, by means comprising a pair of securing plates 32 pivoted to pin 23 and pivotally secured by a rivet 33 to the bifurcated fingers of a trip lever 35 that is pivoted on a pin 36 extending between plates 15. A trip cord 37 is connected to the other end of trip lever 35, it being observed on Fig. 1 that fingers 34 are much shorter in length than the remainder of lever 35.

In operation, after the load is secured on lever 31 it is only necessary to pull the trip cord 37 in a downward direction pivoting the lever about its pin 36, drawing up the pin 31 and simultaneously drawing up the toggle rods 22, thereby causing pivots 21 to draw inwardly the upper ends of pawls 19 and 20. As the free ends of pawls 19 and 20 are drawn together, the jaws 28 and 29 thereof will recede from each other until they will finally simultaneously let go of the opposite sides of boss 30 on link 31, thus dropping the link 31 and attached load in a vertical direction without imparting any pendulous or oscillatory motion thereto.

As will be observed, the spring 25 serves to hold pivot 23 below the plane of pivots 21, thus insuring a positive locking effect regardless of the load on the link 31. On the other hand, only a slight pull on trigger lever 35 by means of cord 37 is necessary to break the toggle effect and draw inward the upper ends of pawls 19 and 20 and release the load.

It will be understood that the above description and accompanying drawing comprehend only the general and preferred embodiment of this invention, and that various changes in construction, proportion and arrangement of parts may be made within the scope of the appended claims, without sacrificing any of the advantages of this invention.

The herein described invention may be manufactured and used by or for the Government of the United States of America for governmental purposes without the payment of any royalties thereon.

I claim:

1. A toggle load supporting and quick release hook comprising a frame, means for supporting said frame, a pair of pawls pivoted on spaced pivots in said frame, a jaw member formed on the end of each pawl, said pawls being pivoted adjacent their jaw ends, said jaw ends being adapted to approach or recede from each other, toggle means pivoted to the other ends of said pawls, said toggle means comprising a pair of toggle rods pivoted to each other, means for resiliently holding the pivoting means of said toggle rods below the plane of the pivoting means between said toggle rods and said pawls to thereby lock said jaw ends in their approach load supporting position, means for raising said toggle pivots through dead center and above the plane of said pawl and toggle pivots to cause said jaws to recede from each other to the load quick releasing position, said raising means including a pivoted trip lever, means linking one end of said trip lever to said toggle pivot, and means in said frame guiding said toggle pivot and limiting its motion.

2. A quick release load supporting device, including a frame, said frame comprising a pair of vertical flat plates, a support pivotally secured between said plates at the top thereof, a pair of bell cranks vertically disposed between said plates with the angles of the bell cranks facing each other, a pair of securing bolts extending between the adjacent ends of the bottom of said plates securing said plates together, each bell crank being pivoted at its angle, one on each of said securing bolts, jaw members formed at the ends of the lower arms of said bell cranks, toggle rods connecting the upper arms of said bell cranks, and means for operating said toggle rods to cause the upper arms of said bell cranks to approach each other thereby swinging the lower jaw arms of said bell cranks away from each other to load-release position.

3. A quick release load supporting device, including a frame, said frame comprising a pair of vertical flat plates, a support pivotally secured between said plates at the top thereof, a pair of bell cranks vertically disposed between said plates with the angles of the bell cranks facing each other, a pair of securing bolts extending between the adjacent ends of the bottom of said plates securing said plates together, each bell crank being pivoted at its angle, one on each of said securing bolts, jaw members formed at the ends of the lower arms of said bell cranks, toggle rods connecting the upper arms of said bell cranks, means for operating said toggle rods to cause the upper arms of said bell cranks to approach each other thereby swinging the lower jaw arms of said bell cranks away from each other to load-release position, said operating means including a pin connecting said toggle rods together, a lever pivoted between said plates, and a link connecting one end of said lever to said toggle rod pin.

4. A quick release load supporting device, including a frame, said frame comprising a pair of vertical flat plates, a support pivotally secured between said plates at the top thereof, a pair of bell cranks vertically disposed between said plates with the angles of the bell cranks facing each other, a pair of securing bolts extending between the adjacent ends of the bottom of said plates securing said plates together, each bell crank being pivoted at its angle, one on each of said securing bolts, jaw members formed at the ends of the lower arms of said bell cranks, toggle rods connecting the upper arms of said bell cranks, means for operating said toggle rods to cause the upper arms of said bell cranks to approach each other thereby swinging the lower jaw arms of said bell cranks away from each other to load-release position, said operating means including a pin connecting said toggle rods together, a lever pivoted between said plates, a link connecting one end of said lever to said toggle rod pin, toggle rod pin guiding slots formed in said plates limiting the movement of said pin, and resilient means connected to said pin normally urging said pin toward toggle locking position.

HARVEY S. HINCHMAN.